Dec. 27, 1938.  C. S. ASH  2,141,457
VEHICLE WHEEL
Filed Oct. 7, 1935  2 Sheets-Sheet 1
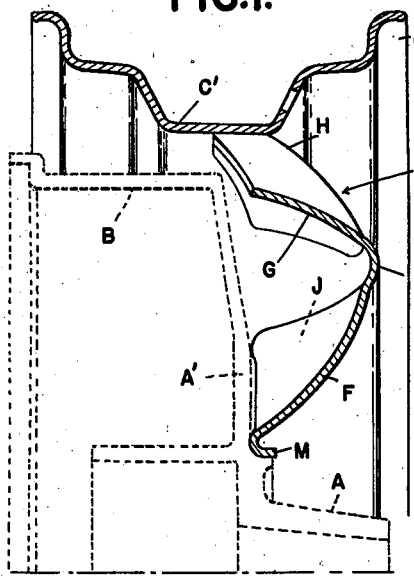
FIG.I.
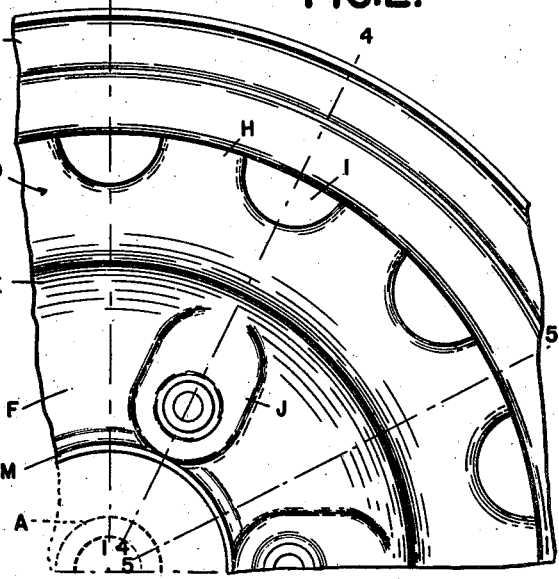
FIG.2.
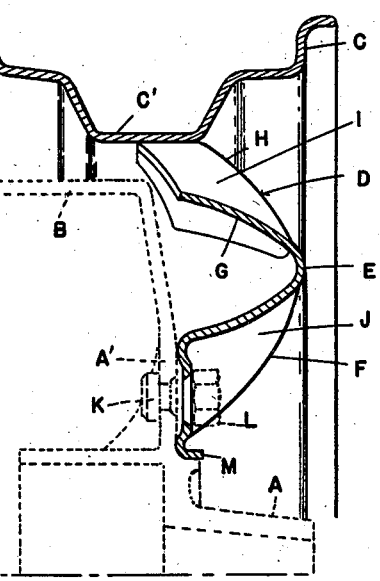
FIG.4.
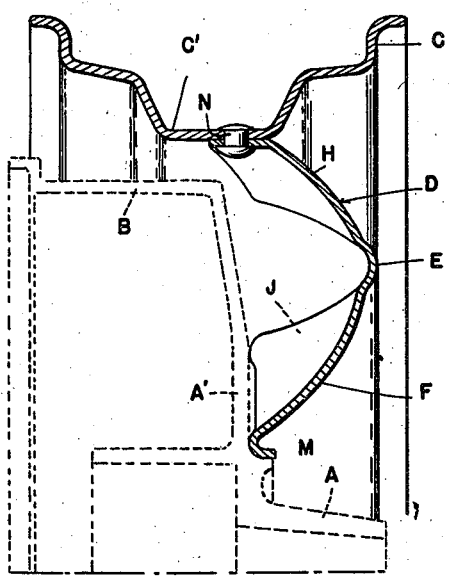
FIG.5.
INVENTOR
CHARLES S. ASH
BY *Whittemore Hulbert & Whittemore Belknap*,
ATTORNEYS Dec. 27, 1938.  C. S. ASH  2,141,457

VEHICLE WHEEL

Filed Oct. 7, 1935  2 Sheets-Sheet 2

INVENTOR
CHARLES S. ASH
BY
ATTORNEYS

Patented Dec. 27, 1938

2,141,457

UNITED STATES PATENT OFFICE 2,141,457

VEHICLE WHEEL

Charles S. Ash, Milford, Mich., assignor to Kelsey-Hayes Wheel Company, Detroit, Mich., a corporation of Delaware Application October 7, 1935, Serial No. 43,961

4 Claims. (Cl. 301—9)

The invention relates to wheels designed for use on motor vehicles and of the type in which the body of the wheel between the hub and the tire supporting rim is formed of pressed sheet metal. It is the object of the present invention to obtain a construction of this pressed sheet metal member which has certain advantages, including a maximum section modulus and a better distribution of stresses to avoid local strains at any point. To this end the invention consists in the construction as hereinafter set forth.

In the drawings:

Figure 1 is a cross-section through a portion of a wheel of my improved construction;

Figure 2 is a side elevation of a portion of the pressed sheet metal annulus;

Figures 6, 7:
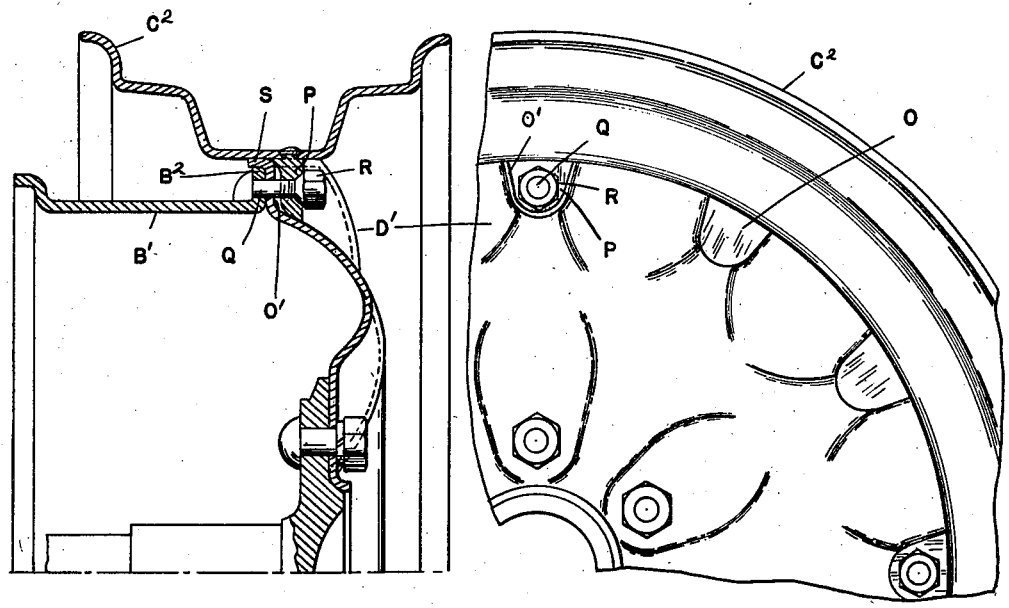

Figures 4 and 5 are radial cross-sections respectively on the lines 4—4 and 5—5 of Figure 2;

Figures 6 and 7 are views similar to Figures 1 and 2 showing a modified construction.

Figure 3:
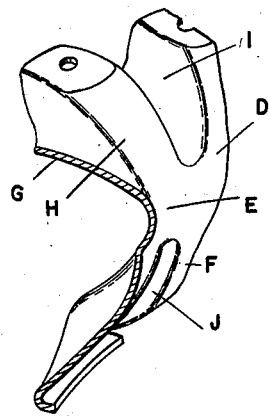
Figure 3 is a sectional perspective view thereof.

As shown in Figures 1 to 3 inclusive, my improved wheel comprises a hub member A and a brake drum B mounted thereon (these parts being shown in dotted lines), and a tire supporting rim C which as shown is the drop-center type. D is the pressed sheet metal annulus which is permanently attached to the rim C and is demountably connected with the hub, the construction being as follows.

The annulus D is of a form which in radial cross-section is a laterally extending arch, the apex E of which is located at a point more than one-half the radial distance between the axis of the wheel and the tire seat on the rim. In certain radial planes this arch extends from the inner to the outer periphery of the annulus, as indicated at F, while in other radial planes it is of substantially semi-elliptical form, as indicated at G, with its minor axis considerably shortened. However, at the apex of the arch the form is continuous throughout the entire circumference. This variation in radial cross-section is for the purpose of forming in the outer portion of the annulus a series of hollow spokes H alternating with spaces or scallops I intermediate said spokes. The inner portion of the annulus is provided with a series of pockets or depressions J, each of which has a bottom portion for seating against the flange A' of the hub A with an aperture for the bolt K, and a surrounding seat for the clamping nut L. There is also a return-bent flange M at the inner periphery of the annulus which seats upon a cylindrical portion of the hub.

The annulus D of the form just described is secured to the rim C preferably by rivets N or other securing means between the outer ends of the spokes H and the drop-center portion C' of the rim. When these parts are mounted on the wheel hub, the stresses will be transmitted from the rim to the hub chiefly through the large arch portion F, but the depressions or corrugations in this arch which respectively form the spokes and the hub seats reinforce the structure imparting to the same the required degree of rigidity.

In Figures 6 and 7, I have shown a modified form of construction in which the brake drum B' is permanently mounted on the outer portion of the annulus D', and the rim C² is demountably secured to this outer portion. The annulus D' is similar in construction to the annulus D but instead of the cut-away portions or scallops I the space between the spokes is bridged by integral web portions O. Certain of these web portions O are used for attaching the annulus to the brake drum by any suitable means, such as welding or riveting B' which has an outwardly extending flange B² bearing against these portions. Other of these webs O' are used for securing the demountable rim, the latter being provided with radially inwardly projecting lugs P riveted or otherwise secured thereto, while bolts Q and clamping nuts R secure these lugs to the annulus and brake drum. There is also preferably a peripheral flange S on the annulus forming a seat for the rim and overlapping the flange B² on the drum.

What I claim as my invention is:

1. In a wheel, the combination with a flanged hub and a tire supporting rim of the drop-center type, of an annulus extending between said hub and rim, said annulus having a radial cross-section in the form of a transversely extending arch the apex of which is spaced from the inner margin more than one-half the radial distance between the same and the outer periphery, the radially inner portion of said arch springing from a return-bent flange forming a cylindrical seat on the hub and the outer portion of said arch springing from the drop-center of the rim, said annulus being further provided with circumferentially spaced depressions in the radially outer portion thereof forming a series of hollow spokes and depressions in the radially inner portion forming seats for engaging the flange of the hub, the form of the arch in a radial plane through said inner and outer depressions being semi-elliptical and having its apex continuous with the apex of the aforesaid arch.

2. In a wheel, the combination with a flanged hub, of an annulus secured to said hub and having a radial cross-section in the form of a transversely extending arch, said annulus also having a circumferential series of depressions in the outer and inner portions thereof, those in the inner portions forming seats for engaging the flange of the hub, a demountable rim having inwardly extending lugs engaging certain of the outer depressions in said annulus and detachably secured thereto, and a brake drum secured to other of said depressed outer portions in the annulus.

3. In a wheel, the combination with a hub and a rim, of an annulus extending therebetween, said annulus having a radial cross-section in the form of a transversely extending relatively deep arch, the apex of which is spaced from the inner margin more than one-half the radial distance between the same and the outer periphery, and axially inwardly and radially extending corrugations in the portions of said arch on both the radially inner and outer side of the apex thereof.

4. In a wheel, the combination with a flanged hub and a tire supporting rim, of an annulus secured to said rim and demountably secured to said hub, said annulus having a radial cross-section in the form of a transversely extending relatively deep arch the apex of which is spaced from the inner margin more than one-half the radial distance between the same and the outer periphery, said annulus being further provided with depressions forming axially inwardly extending radial corrugations in the radially outer and inner portions thereof, said corrugations respectively forming hollow spokes which engage the rim and seats for engaging the flange of the hub.

CHARLES S. ASH.